United States Patent
Nishijima et al.

(10) Patent No.: US 12,530,903 B2
(45) Date of Patent: Jan. 20, 2026

(54) INFORMATION PROCESSING APPARATUS AND METHOD

(71) Applicants: TOYOTA JIDOSHA KABUSHIKI KAISHA, Aichi-ken (JP); NTT, Inc., Tokyo (JP)

(72) Inventors: Toshifumi Nishijima, Kasugai (JP); Ko Koga, Tokyo-to (JP); Hiroaki Sugiyama, Musashino (JP)

(73) Assignees: TOYOTA JIDOSHA KABUSHIKI KAISHA, Aichi-ken (JP); NTT, Inc., Tokyo (JP)

( * ) Notice: Subject to any disclaimer, the term of this patent is extended or adjusted under 35 U.S.C. 154(b) by 97 days.

(21) Appl. No.: 18/396,620

(22) Filed: Dec. 26, 2023

(65) Prior Publication Data

US 2024/0212357 A1 Jun. 27, 2024

(30) Foreign Application Priority Data

Dec. 27, 2022 (JP) .................. 2022-209924

(51) Int. Cl.
*G06V 10/00* (2022.01)
*G06F 3/01* (2006.01)
(Continued)

(52) U.S. Cl.
CPC .............. *G06V 20/56* (2022.01); *G06F 3/013* (2013.01); *G06T 7/20* (2013.01); *G06T 7/62* (2017.01);
(Continued)

(58) Field of Classification Search
CPC .... G06V 20/56; G06V 10/25; G06V 2201/07; G06V 20/58; G06F 3/013; G06T 7/20; G06T 7/62; G10L 13/02; G10L 13/027
See application file for complete search history.

(56) References Cited

U.S. PATENT DOCUMENTS 12,096,021 B2 * 9/2024 Zhang .................... H04N 19/52
12,108,058 B2 * 10/2024 Liao ....................... H04N 19/70
(Continued)

FOREIGN PATENT DOCUMENTS

JP 2020-077272 A 5/2020

OTHER PUBLICATIONS

Sugiyama et al., "Conversational system that talks about the scenery seen from vehicles", The Japanese Society for Artificial Intelligence, The 36th Annual Conference of the Japanese Society for Artificial Intelligence, [online], Jun. 2022, [retrieved Oct. 27, 2022], Internet <URL:https://www.jstage.jst.go.jp/article/pjsai/JSAI2022/0/JSAI2022_2N5OS7a04/_article/-char/ja/>, 8pp.

*Primary Examiner* — Frank F Huang
(74) *Attorney, Agent, or Firm* — HAUPTMAN HAM, LLP (57) ABSTRACT

An information processing apparatus includes a processor configured to: select one or more first objects detected from a predetermined range in a captured image from a vehicle-mounted camera that takes an outward direction from a vehicle as a capturing range, the predetermined range being based on a field of view of an onboard person in the vehicle, and generate utterance content that takes the one or more first objects as a topic, the utterance content being to be uttered to the onboard person. The processor sets the predetermined range based on at least one of a traveling speed of the vehicle, whether traveling is performed by autonomous driving of the vehicle or not, and a position where a line of sight of the onboard person is focused on.

11 Claims, 5 Drawing Sheets

(51) Int. Cl.
*G06T 7/20* (2017.01)
*G06T 7/62* (2017.01)
*G06V 10/25* (2022.01)
*G06V 20/56* (2022.01)
*G10L 13/02* (2013.01)

(52) U.S. Cl.
CPC .............. G06V 10/25 (2022.01); G10L 13/02 (2013.01); *G06V 2201/07* (2022.01)

(56) References Cited

U.S. PATENT DOCUMENTS

| | | | |
|---|---|---|---|
| 12,137,224 B2 * | 11/2024 | Shima | H04N 19/186 |
| 12,244,807 B2 * | 3/2025 | Holland | G06N 3/08 |
| 2013/0251032 A1 * | 9/2013 | Tanaka | H04N 19/174 |
| | | | 375/240.03 |
| 2013/0259118 A1 * | 10/2013 | Fu | H04N 19/169 |
| | | | 375/240.02 |
| 2013/0266058 A1 * | 10/2013 | Minoo | H04N 19/13 |
| | | | 375/240.02 |
| 2013/0329784 A1 * | 12/2013 | Chuang | H04N 19/176 |
| | | | 375/240.02 |

\* cited by examiner

*FIG. 5*

INFORMATION PROCESSING APPARATUS AND METHOD

CROSS REFERENCE TO THE RELATED APPLICATION

This application claims the benefit of Japanese Patent Application No. 2022-209924, filed on Dec. 27, 2022, which is hereby incorporated by reference herein in its entirety.

BACKGROUND

Technical Field

The present disclosure relates to a machine that has a conversation with a person.

Description of the Related Art

There is disclosed a conversation system that selects a first keyword from a plurality of keywords related to a subject shown in a shared image that is shared with a user, and that autonomously utters a conversation sentence that uses the first keyword (for example, Patent Document 1).

CITATION LIST

Patent Document

[Patent Document 1] Japanese Patent Laid-Open No. 2020-077272
[Non-Patent Document 1] Hiroaki Sugiyama, Ko Koga, Toshifumi Nishijima, "Conversational system that talks about the scenery seen from vehicles", [online], June 2022, The Japanese Society for Artificial Intelligence, The 36th Annual Conference of the Japanese Society for Artificial Intelligence, 2022, [retrieved Oct. 27, 2022], Internet <URL:https://www.jstage.jst.go.jp/article/pjsai/JSAI2022/0/JSAI2022_2N5OS7a04/_article/-char/ja/>

An aspect of the disclosure is aimed at providing an information processing apparatus and a method that are capable of providing a smooth conversation to an onboard person in a moving object.

SUMMARY

An aspect of the present disclosure is an information processing apparatus including a processor configured to:
  select one or more first objects detected from a predetermined range in a captured image from an on-board camera that takes an outward direction from a moving object as a capturing range, the predetermined range being based on a field of view of an onboard person in the moving object, and
  generate utterance content that takes the one or more first objects as a topic, the utterance content being to be uttered to the onboard person.
Another aspect of the present disclosure is a method for causing a computer to:
  select one or more first objects detected from a predetermined range in a captured image from an on-board camera that takes an outward direction from a moving object as a capturing range, the predetermined range being based on a field of view of an onboard person in the moving object, and
  generate utterance content that takes the one or more first objects as a topic, the utterance content being to be uttered to the onboard person.

According to an aspect of the present disclosure, a smooth conversation may be provided to an onboard person in a moving object.

DESCRIPTION OF THE EMBODIMENTS

A conversational agent that chats with an onboard person about scenery seen from a vehicle window is being developed. It is considered that the conversational agent contributes to preventing occurrence of a traffic accident caused by concentration being reduced due to long drive or concentration being reduced while monitoring autonomous driving, for example. However, when a vehicle is traveling, scenery from the vehicle window changes as the vehicle moves, and an onboard person is possibly not able to find a subject that is taken as a topic.

According to an aspect of the present disclosure, to solve such a problem, an object that is detected from a range that is easily viewable by an onboard person and the object being also captured in a captured image from an on-board camera for capturing scenery from a vehicle window is taken as a topic of utterance content. More specifically, an aspect of the present disclosure is an information processing apparatus including a processor. The processor may select one or more first objects detected from a predetermined range in a captured image from an on-board camera, the predetermined range being based on a field of view of an onboard person in a vehicle, and generate utterance content that takes the one or more first objects as a topic, the utterance content being to be uttered to the onboard person. The on-board camera may take an outward direction from the vehicle as a capturing range.

For example, the information processing apparatus may be a dedicated computer such as a server. In the case where the information processing apparatus is a server, the processor is a processor such as a central processing unit (CPU) or a digital signal processor (DSP) that is provided in the server, for example. Alternatively, the information processing apparatus may be a data communication apparatus that is mounted on a vehicle, a car navigation system, a dashboard camera, or a dedicated on-board apparatus such as an electronic control unit (ECU), for example. In the case where the information processing apparatus is an on-board apparatus, the processor is a processor such as a CPU or a DSP that is provided in the on-board apparatus, for example.

The predetermined range in the captured image where the first object is detected may be based on the field of view of the onboard person. Therefore, according to an aspect of the present disclosure, the onboard person in the vehicle may easily find the first object that is a topic of an utterance that is provided by the information processing apparatus. Therefore, according to an aspect of the present disclosure, a smooth conversation may be provided to the onboard person in the vehicle. Furthermore, in the case where the information processing apparatus performs image analysis on the captured image, a range that is a target of the image analysis is smaller than the captured image, and a processing load on the information processing apparatus may be reduced.

In an aspect of the present disclosure, the processor may be further configured to set the predetermined range in the captured image, where the first object is detected, based on at least one of a traveling speed of the vehicle, whether traveling is performed by autonomous driving of the vehicle or not, and a position where a line of sight of the onboard person is focused on. For example, the processor may set the predetermined range to be narrower, the greater the traveling speed of the vehicle. This is because a range in which the onboard person is able to capture an object is more narrowed, the greater the traveling speed of the vehicle. For example, in the case where the vehicle adopts autonomous driving, the processor does not have to set the predetermined range, or may take all of the captured image as the predetermined range. This is because, in the case where the vehicle adopts an autonomous driving mode, the onboard person does not drive and the range in which the onboard person is able to capture an object is relatively wide. For example, the processor may set the predetermined range by taking, as a center, the position where the line of sight of the onboard person is focused on. According to an aspect of the present disclosure, the onboard person is allowed to easily find the first object that is the topic of an utterance.

In an aspect of the present disclosure, the processor may select, as the one or more first objects, an object, a size of which in the captured image takes a predetermined value or more, among at least one object included in the predetermined range in the captured image. An object, a size of which in the captured image is smaller than a predetermined value, is not easily found by the onboard person. Accordingly, by taking an object, a size of which in the captured image takes a predetermined value or more, as a topic of utterance, an object that is not easily found by the onboard person may be prevented from being made the topic of an utterance.

In an aspect of the present disclosure, the processor may stop generation of the utterance content in a case where a travel state of the vehicle satisfies a predetermined condition indicating a state where a load on the onboard person is high. For example, the predetermined condition is that the vehicle is turning right or left, that the vehicle is entering an intersection, or that the vehicle is merging onto a highway. Safety of driving may be secured by preventing utterance in a state where the travel state of the vehicle imposes a high load on the onboard person.

In the following, embodiments of the present disclosure will be described with reference to the drawings. The configuration of the embodiments described below are examples, and the present disclosure is not limited to the configuration of the embodiments.

First Embodiment

Figure 1:
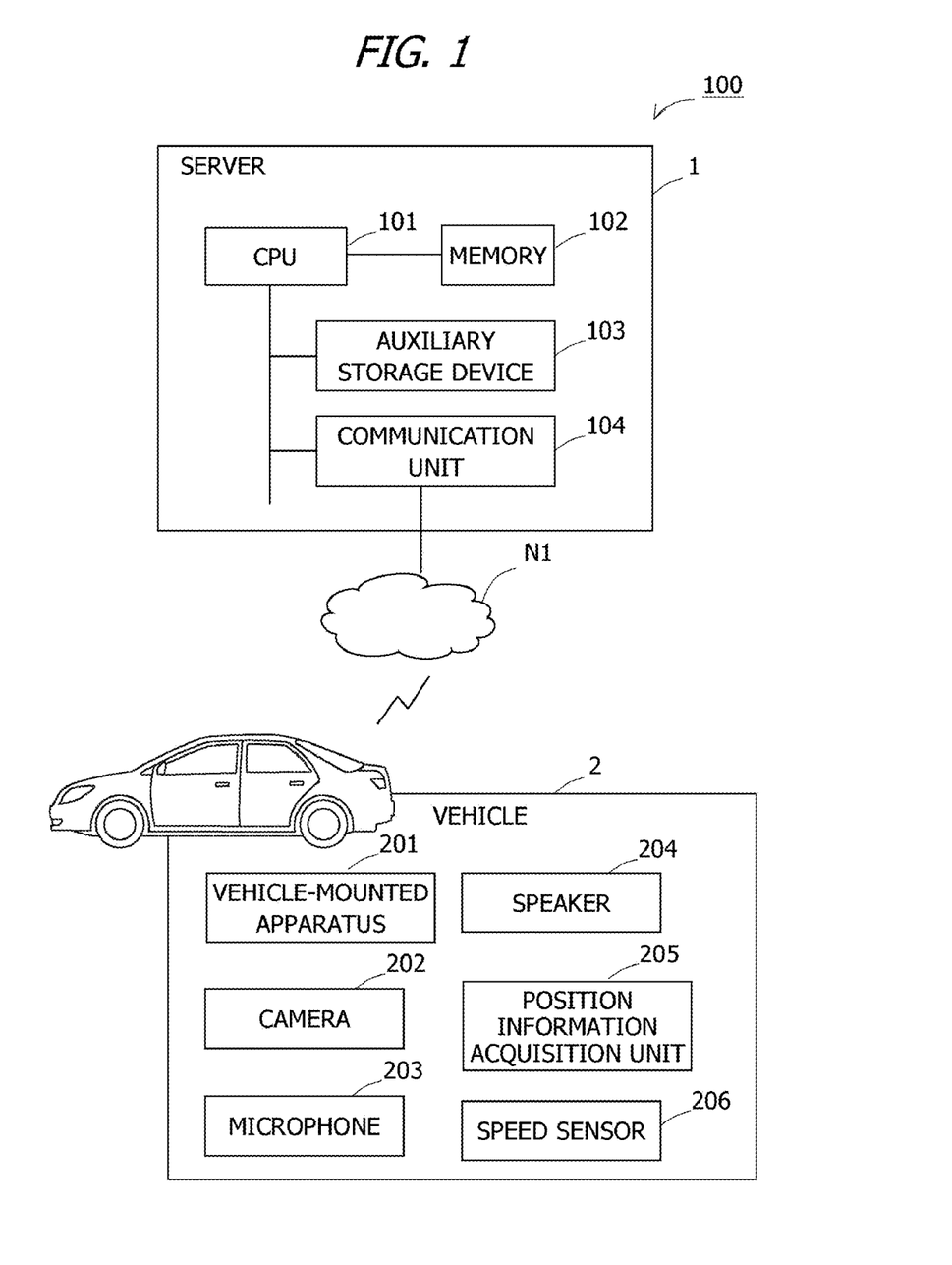
FIG. 1 is a diagram according to a first embodiment, illustrating an example of a system configuration of a conversational system and hardware configurations of a server and a vehicle.

FIG. 1 is a diagram according to a first embodiment, illustrating an example of a system configuration of a conversational system 100 and hardware configurations of a server and a vehicle. The conversational system 100 is a system that provides a conversation service for an onboard person in a vehicle. The conversational system 100 includes a server 1 and a vehicle 2. The server 1 and the vehicle 2 are each connected to a network N1, and are capable of communicating with each other over the network N1. The network N1 is a public network such as the Internet, for example.

The vehicle 2 is a so-called connected vehicle provided with a vehicle-mounted apparatus 201 including a communication function. Furthermore, in the first embodiment, the vehicle 2 is assumed to be a vehicle that travels while switching between autonomous driving and traveling based on operation by a driver. However, the vehicle 2 also includes a vehicle that is not capable of autonomous driving.

The vehicle 2 transmits, to the server 1 via the vehicle-mounted apparatus 201, a captured image from a camera 202 that is installed facing outside the vehicle every predetermined period of time. Furthermore, the vehicle 2 transmits, to the server 1 via the vehicle-mounted apparatus 201, audio data of voice that is uttered by the onboard person in the vehicle and that is collected by a microphone 203.

The server 1 generates utterance content based on each of the captured image from the camera 202 and the audio data of utterance that are received from the vehicle 2. The utterance content generated from the captured image will be referred to below as impression utterance. The utterance content generated from the utterance of the onboard person will be referred to below as context utterance. The server 1 selects the utterance content to be output, from the impression utterance and the context utterance, and transmits the same to the vehicle 2. In the following, the utterance content output from the server 1 will be referred to as system utterance. The vehicle 2 outputs the system utterance received from the server 1, from the microphone 203. By repeating the process, a conversation is held between the onboard person and the conversational system 100.

In the first embodiment, the server 1 generates utterance content that takes, as a topic, an object that is detected from a predetermined range in the captured image. The predetermined range is a range that is set such that the onboard person is able to easily find an object. The server 1 does not generate utterance content that takes, as the topic, an object that is included in the captured image but outside the predetermined range. This is because such an object is possibly not easily found by the onboard person. For example, in the case where an impression utterance that is generated by taking, as the topic, an object that is detected from the predetermined range in the captured image is provided to the onboard person in the vehicle 2, the onboard person is able to easily find, from a vehicle window, the object that is the topic of the system utterance. A smooth conversation with the conversational system 100 may thereby be provided to the onboard person.

Next, hardware configurations of the server 1 and the vehicle 2 will be described. As hardware components, the server 1 includes a CPU 101, a memory 102, an auxiliary storage device 103, and a communication unit 104. The memory 102 and the auxiliary storage device 103 are each an example of a computer-readable recording medium.

The auxiliary storage device 103 stores various programs, and data to be used by the CPU 101 at the time of execution of each program. For example, the auxiliary storage device 103 is a hard disk drive (HDD), a solid state drive (SSD), and the like. Programs to be held in the auxiliary storage device 103 include an operating system (OS), and other programs, for example.

The memory 102 is a main memory that provides a working area and a memory area where programs stored in the auxiliary storage device 103 are loaded, and that is used as a buffer, for example. The memory 102 includes semiconductor memories such as a read only memory (ROM) and a random access memory (RAM), for example.

The CPU 101 performs various processes by loading, into the memory 102, and executing the OS and various other programs held in the auxiliary storage device 103. The number of CPUs 101 is not limited to one, and may be more than one. The CPU 101 is an example of "processor".

The communication unit 104 is a module connecting to a network cable and including a circuit for signal processing such as a local area network (LAN) card and an optical module, for example. The communication unit 104 is not limited to a circuit that can be connected to a wired network, and may instead be a wireless signal processing circuit that is capable of processing wireless signals of a wireless communication network such as WiFi. Additionally, the hardware configuration of the server 1 is not limited to the one illustrated in FIG. 1.

Next, the vehicle 2 includes, as hardware components, the vehicle-mounted apparatus 201, the camera 202, the microphone 203, a speaker 204, a position information acquisition unit 205, and a speed sensor 206. Additionally, as the hardware components of the vehicle 2, FIG. 1 extracts and illustrates elements related to processing by the conversational system 100. The vehicle-mounted apparatus 201, the camera 202, the microphone 203, the speaker 204, the position information acquisition unit 205, and the speed sensor 206 are interconnected by a predetermined in-vehicle network or the like.

For example, the vehicle-mounted apparatus 201 is a data communication apparatus, a car navigation system, a dashboard camera, or an ECU for the conversational system 100. As hardware components, the vehicle-mounted apparatus 201 includes a CPU, a memory, an auxiliary storage device, and a wireless communication unit. The CPU, the memory, and the auxiliary storage device are the same as the CPU 101, the memory 102, and the auxiliary storage device 103. The wireless communication unit of the vehicle-mounted apparatus 201 is a wireless signal processing circuit compatible with any of mobile communication methods such as 5G, 4G, long term evolution (LTE), and 6G, and wireless communication methods such as Wi-Fi, WiMAX, and dedicated short range communications (DSRC), for example.

The vehicle-mounted apparatus 201 acquires the captured image from the camera 202 every predetermined period of time, and transmits the same to the server 1. The period of time at which the captured image from the camera 202 is transmitted by the vehicle-mounted apparatus 201 may be the same as a capturing period of the camera 202, or may be freely set from 1 second to 10 seconds by an administrator of the conversational system 100 or the onboard person, for example. The capturing period of the camera 202 takes a value from 15 fps to 60 fps, for example. Moreover, the vehicle-mounted apparatus 201 transmits utterance content from the onboard person to the server 1. The utterance content from the onboard person is acquired by the microphone 203 collecting voice of the onboard person. Furthermore, in the case where the system utterance is received from the server 1, the vehicle-mounted apparatus 201 outputs the same from the speaker 204. A data format of the utterance content transmitted and received between the vehicle-mounted apparatus 201 and the server 1 may be audio data or text data, for example.

The camera 202 is installed on a windshield of the vehicle 2, near a ceiling, in a manner facing outside the vehicle 2 such that a front area of the vehicle 2 is taken as the capturing range, for example. The camera 202 may be a camera that is installed in a dashboard camera, or may be a camera that is installed for the conversational system 100, for example. A plurality of cameras 202 may be provided in the vehicle 2. In the case where a plurality of cameras 202 are provided, the cameras 202 may include cameras that are installed on left and right wing mirrors. The cameras 202 may include a camera that is installed on the windshield of the vehicle, near the ceiling, in a manner facing inside the vehicle 2 to detect a line-of-sight direction of the onboard person.

In the first embodiment, the microphone 203 outputs collected sound to the vehicle-mounted apparatus 201. In the first embodiment, the speaker 204 converts audio data input from the vehicle-mounted apparatus 201 into sound, and outputs the same. The microphone 203 and the speaker 204 may be a microphone and a speaker that are installed in a car navigation system or a dashboard camera, for example. Alternatively, the microphone 203 and the speaker 204 may be a microphone and a speaker that are installed for the conversational system 100, for example.

The position information acquisition unit 205 acquires position information of the vehicle 2 every predetermined period of time. The position information acquisition unit 205 is a global positioning system (GPS) receiver, for example. In the first embodiment, the camera 202 acquires the position information from the position information acquisition unit 205 every predetermined period of time, and attaches the same to the captured image.

The speed sensor 206 is a sensor that measures a traveling speed of the vehicle 2. The hardware configuration of the vehicle 2 is merely an example, and is not limited to the hardware configuration illustrated in FIG. 1. For example, the vehicle 2 also includes a sensor that acquires a traveling direction of the vehicle 2, a sensor that detects a steering angle, and a sensor that detects a brake depression amount. The vehicle-mounted apparatus 201 transmits, to the server 1, together with the captured image from the camera 202 or the utterance content from the onboard person, an acquisition time, position information indicating an acquisition position, identification information of the vehicle 2, and information about a travel state of the vehicle 2. Information about a travel state of the vehicle 2 is information indicating whether the vehicle is in an autonomous driving mode or a manned driving mode, and information such as the traveling speed of the vehicle 2, the traveling direction of the vehicle 2, and the steering angle, for example.

Figure 2:
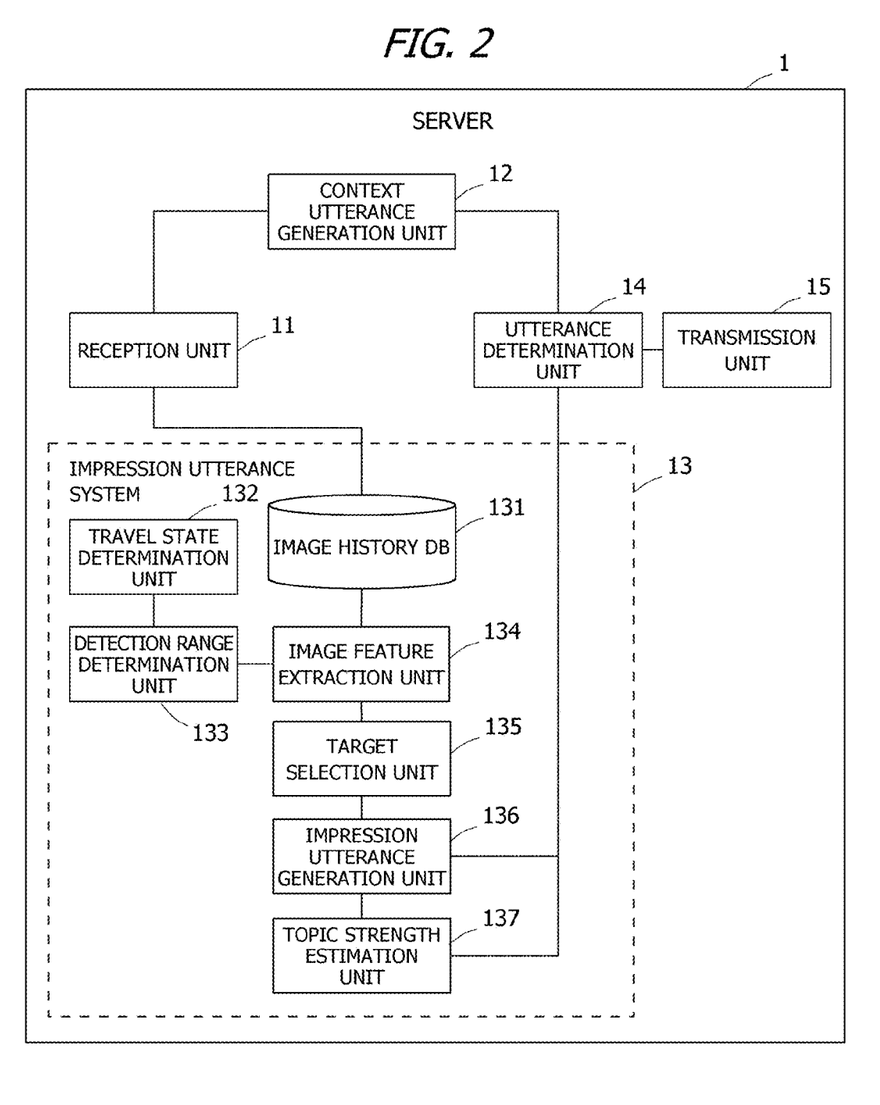
FIG. 2 is a diagram illustrating an example of a functional configuration of the server.

FIG. 2 is a diagram illustrating an example of a functional configuration of the server 1. As functional components, the server 1 includes a reception unit 11, a context utterance generation unit 12, an impression utterance system 13, an utterance determination unit 14, and a transmission unit 15. Processes by the functional structural elements are implemented through execution of predetermined programs by the CPU 101.

The reception unit 11 receives, from the vehicle 2, the captured image from the camera 202 and the utterance content from the onboard person. The reception unit 11 stores the captured image from the camera 202 in an image history DB 131 described later. The reception unit 11 outputs the utterance content from the onboard person to the context utterance generation unit 12. The acquisition time, the position information indicating the acquisition position, the identification information of the vehicle 2, and information about the travel state of the vehicle 2 are also received from the vehicle 2, together with the captured image from the camera 202 and the utterance content from the onboard person. In the following, a simple term "captured image" will refer to the captured image from the camera 202. Additionally, in the case where the captured image is received from the vehicle 2 at a same period as the capturing period, the reception unit 11 may thin out the captured images, and may save the captured images received every one second in the image history DB 131, for example. Reducing the number of captured images that are to be saved in the image history DB 131 allows a processing load on the server 1 to be reduced.

In the case where utterance content from the onboard person is input from the reception unit 11, the context utterance generation unit 12 generates the context utterance based on the utterance content. A method of generating the context utterance by the context utterance generation unit 12 is not limited to a specific method. For example, the context utterance generation unit 12 generates the context utterance by inputting, to a machine learning model, a history of utterance content including the utterance content from the onboard person received, the captured image from the camera 202, and spot information according to the position information of the captured image. The machine learning model used to generate the context utterance is a Transformer Encoder-decoder model, for example. The context utterance generation unit 12 outputs the context utterance that is generated to the utterance determination unit 14.

The impression utterance system 13 generates the impression utterance from the captured image from the camera 202 every predetermined period of time. Details of the process by the impression utterance system 13 will be given later. The impression utterance system 13 outputs the impression utterance that is generated to the utterance determination unit 14. Additionally, the number of impression utterances generated by the impression utterance system 13 is not limited to one, and may be more than one.

The utterance determination unit 14 receives input of the context utterance from the context utterance generation unit 12. Furthermore, the utterance determination unit 14 receives input of the impression utterance from the impression utterance system 13. For example, the utterance determination unit 14 determines which of the context utterance or the impression utterance is to be taken as the system utterance, according to a timing of input of the context utterance or the impression utterance. In the case where an utterance of the onboard person is not input after a lapse of a predetermined period of time that takes, as a base point, one of an immediately preceding system utterance, an utterance of the onboard person, and a conversation start time, the utterance determination unit 14 outputs, as the system utterance, an utterance with greatest topic strength among the impression utterances within the predetermined period of time. The topic strength of an impression utterance is a level of priority of the impression utterance. In the case where an utterance of the onboard person is input within a predetermined period of time from a previous system utterance, the utterance determination unit 14 outputs, as the system utterance, the context utterance that is generated with the utterance of the onboard person as a point of origin. Additionally, a method of determining the system utterance by the utterance determination unit 14 is not limited to the method described above. When the system utterance is input from the utterance determination unit 14, the transmission unit 15 transmits the same to the vehicle 2.

The impression utterance system 13 includes the image history DB 131, a travel state determination unit 132, a detection range determination unit 133, an image feature extraction unit 134, a target selection unit 135, an impression utterance generation unit 136, and a topic strength estimation unit 137. For example, the image history DB 131 is generated in a memory area in the auxiliary storage device 103 of the server 1. The image history DB 131 holds the captured image from the camera 202 received from the vehicle 2, together with a capturing time, position information indicating a capturing position, and information indicating the travel state of the vehicle.

The travel state determination unit 132 determines whether the vehicle 2 is in the autonomous driving mode or the manned driving mode. The determination is performed based on the information about the travel state of the vehicle 2 that is received from the vehicle 2 together with the captured image from the camera 202. In the case where the vehicle 2 is in the autonomous driving mode, the travel state determination unit 132 outputs a notification indicating that the vehicle 2 is in the autonomous driving mode to the detection range determination unit 133.

In the case where the vehicle 2 is in the manned driving mode, the travel state determination unit 132 determines, based on the information about the travel state of the vehicle 2, whether a predetermined condition indicating a state where a driving load related to the vehicle 2 is high for the onboard person is met or not. A state where the driving load is high is a state where the vehicle 2 is turning right or left, a state of entering an intersection, or a state of traveling near a merge point for a highway, for example. In the case where a state where the driving load related to the vehicle 2 is high is determined, the travel state determination unit 132 stops the process. In the case where a state where the driving load related to the vehicle 2 is not high is determined, the travel state determination unit 132 outputs a notification indicating the manned driving mode to the detection range determination unit 133.

The detection range determination unit 133 sets a detection range for an object within the captured image from the camera 202 according to the driving mode of the vehicle 2. In the case where there is an input from the travel state determination unit 132 indicating that the vehicle 2 is in the autonomous driving mode, the detection range determination unit 133 sets an entire range of the captured image as the detection range, for example.

In the case where there is an input from the travel state determination unit 132 indicating that the vehicle 2 is in the manned driving mode, the detection range determination unit 133 sets a predetermined range as the detection range. For example, the detection range in the case where manned driving is being adopted by the vehicle 2 is a range of 60 degrees left and right and 15 degrees above and below with respect to a position, in the captured image, that is set as a position of a line of sight of a driver. However, the detection range in the case where manned driving is being adopted by the vehicle 2 is not limited to such an example.

Moreover, for example, the detection range determination unit 133 may determine the detection range in the captured image based on the traveling speed of the vehicle 2. The detection range determination unit 133 sets the detection range to be narrower, the greater the traveling speed. For example, in the case where the traveling speed of the vehicle 2 is equal to or greater than a first threshold and smaller than a second threshold, the detection range determination unit 133 sets the detection range to an initial value. For example, the initial value of the detection range is 60 degrees left and right and 15 degrees above and below with respect to the line of sight of the driver. For example, in the case where the traveling speed of the vehicle 2 is equal to or greater than the second threshold, the detection range determination unit 133 sets the detection range to be a range narrower than the initial value. For example, in the case where the traveling speed of the vehicle 2 is smaller than the first threshold, the detection range determination unit 133 sets the detection range to be a range wider than the initial value. In the case where the vehicle 2 is in a stopped state, the detection range determination unit 133 may set the entire range of the captured image as the detection range. The detection range determination unit 133 outputs a set value of the detection range to the image feature extraction unit 134.

When the set value of the detection range is input from the detection range determination unit 133, the image feature extraction unit 134 performs detection of an object included in the detection range with respect to the captured image that is stored in the image history DB 131. For example, a machine learning model such as Deformable-DETR is used for detection of an object in the captured image. However, the machine learning model used for detection of an object in the captured image is not limited to Deformable-DETR. The image feature extraction unit 134 may perform detection of an object by the machine learning model with respect to the detection range in the captured image. Alternatively, the image feature extraction unit 134 may perform extraction of an object included in the detection range after detecting an object by the machine learning model with respect to the entire captured image. The image feature extraction unit 134 outputs, to the target selection unit 135, information about an object detected from the detection range in the captured image. A plurality of objects may be detected from the detection range in the captured image. Information about an object detected from the detection range in the captured image includes a type of the object, and a position in the captured image, for example. The type of an object may be a building, a mark, a plant, or a person, for example. However, the type of an object that the image feature extraction unit 134 is able to detect is not limited thereto. For example, the image feature extraction unit 134 may also detect the type of an object based on an external color, such as a building with a red roof.

The target selection unit 135 receives, from the image feature extraction unit 134, input of information about an object that is detected from the detection range in the captured image. Furthermore, the target selection unit 135 removes an object that is not easily found and extracts an object that can be easily found, from objects detected from the detection range in the captured image. For example, an object having a small size in the captured image is not easily found from the vehicle window, or is not seen in detail. The target selection unit 135 extracts an object, a size of which in the captured image takes a predetermined value or more, from objects detected from the detection range in the captured image, and outputs information about the extracted object to the impression utterance generation unit 136. A threshold for the size of an object in the captured image may be defined by the number of pixels, for example.

The impression utterance generation unit 136 receives, from the target selection unit 135, input of information about at least one object extracted by the target selection unit 135 from a plurality of objects detected from the detection range in the captured image. The impression utterance generation unit 136 acquires spot information in relation to the at least one object, inputs the same to a machine learning model, and acquires at least one impression utterance. The machine learning model used by the impression utterance generation unit 136 is a Transformer Encoder-decoder model, for example. However, the machine learning model that is used by the impression utterance generation unit 136 to generate the impression utterance is not limited thereto. Spot information about an object is information that is obtained by searching through big data such as map information, the Internet, and social network service (SNS) based on the position information, an external appearance of the object, and the like. The impression utterance generation unit 136 outputs the at least one impression utterance that is generated to the topic strength estimation unit 137 and the utterance determination unit 14.

The topic strength estimation unit 137 receives input of the at least one impression utterance from the impression utterance generation unit 136. The topic strength estimation unit 137 estimates strength of each impression utterance. Strength of an impression utterance is estimated using a machine learning model obtained by learning strength of a topic that is added to a set of an image and an utterance that is learning data for a machine learning model that is used for generation of the impression utterance, for example. The machine learning model used for estimation of topic strength is k-nearest neighbor (kNN), for example. The topic strength estimation unit 137 outputs an estimation result related to the strength of the impression utterance to the utterance determination unit 14.

The topic strength estimation unit 137 may perform estimation in such a way that the strength is increased for an impression utterance that takes, as the topic, an object, an external appearance of which includes a predetermined feature, for example. A predetermined feature may be defined based on a color or a design of a roof or a wall, letters on a signboard, or the like, for example. In the case where "red roof" is defined as the predetermined feature, for example, the topic strength estimation unit 137 performs estimation in such a way that strength of the impression utterance that takes, as the topic, an object having a red roof is increased than for other objects. An object having a predetermined feature is easier for the onboard person to find. When strength of an impression utterance that takes such an object as the topic is increased, the probability of the impression utterance being selected as the system utterance is increased.

Additionally, to perform estimation in such a way that the strength of an impression utterance that takes, as the topic, an object, an external appearance of which has a predetermined feature, is increased, the machine learning model to be used for estimation of the topic strength is trained to perform such estimation. For example, in training data for the machine learning model to be used for estimation of the topic strength, the strength may be set high for the utterance that takes, as the topic, an object having the predetermined feature. Additionally, the functional configuration of the server 1 is not limited to the configuration illustrated in FIG. 2.

<Flow of Processes>

Figure 3:
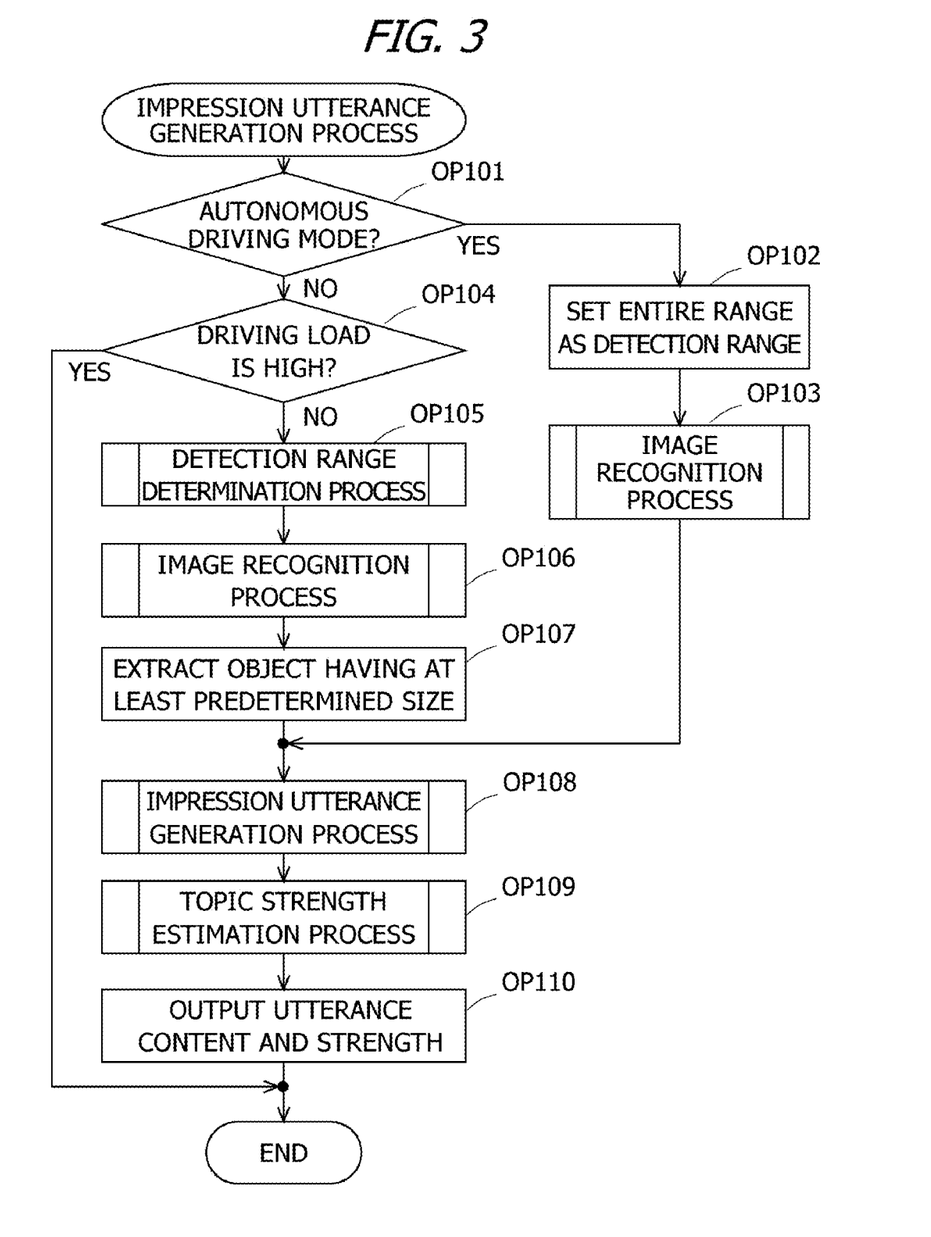
FIG. 3 is an example of a flowchart of an impression utterance generation process by the server.

FIG. 3 is an example of a flowchart of an impression utterance generation process by the server 1. The process illustrated in FIG. 3 is repeated every predetermined period of time, for example. An execution period of the process illustrated in FIG. 3 is freely set from one second to 10 seconds by the administrator of the conversational system 100 or the onboard person of the vehicle 2, for example. A main performer of the process illustrated in FIG. 3 is the CPU 101 of the server 1. However, in FIG. 3, a functional structural element is described to be the performer for the sake of convenience. The process illustrated in FIG. 3 is performed on a latest captured image that is stored in the image history DB 131 at a timing of start. In the description of FIG. 3, a captured image refers to the latest captured image that is stored in the image history DB 131 at the timing of start.

In OP101, the travel state determination unit 132 determines whether the vehicle 2 is in the autonomous driving mode or the manned driving mode, based on the information about the travel state of the vehicle 2 that is stored in the image history DB 131 together with the captured image. In the case where the vehicle 2 is in the autonomous driving mode (OP101: YES), the process proceeds to OP102. In the case where the vehicle 2 is in the manned driving mode (OP101: NO), the process proceeds to OP104.

In OP102, because the vehicle 2 is in the autonomous driving mode, the detection range determination unit 133 sets the entire captured image as the detection range. In OP103, the image feature extraction unit 134 performs an image recognition process on the entire captured image, and detects an object included in the captured image. Then, the process proceeds to OP108.

In OP104, because the vehicle 2 is in the manned driving mode, the travel state determination unit 132 determines whether the vehicle 2 is in a state where the driving load on the onboard person is high. In the case where the vehicle 2 is in a state where the driving load on the onboard person is high (OP104: YES), the process illustrated in FIG. 3 is ended, and the impression utterance is not generated.

In the case where the vehicle 2 is not in a state where the driving load on the onboard person is high (OP104: NO), the process proceeds to OP105. In OP105, the detection range determination unit 133 performs a detection range determination process, and determines the detection range. Details of the detection range determination process will be given later.

In OP106, the image feature extraction unit 134 performs the image recognition process on the captured image, and detects an object from the detection range in the captured image. In OP107, the target selection unit 135 extracts an object having at least a predetermined size from at least one object detected by the image feature extraction unit 134 from the detection range in the captured image.

In OP108, the impression utterance generation unit 136 generates the impression utterance in relation to the object detected from the captured image. In OP109, the topic strength estimation unit 137 estimates strength of the topic in relation to the impression utterance generated by the impression utterance generation unit 136. In OP110, the impression utterance and estimated strength of the impression utterance are output to the utterance determination unit 14 respectively from the impression utterance generation unit 136 and the topic strength estimation unit 137. Then, the process illustrated in FIG. 3 is ended. The utterance determination unit 14 determines one of the context utterance or the impression utterance to be the system utterance, based on a timing of input of the context utterance or the impression utterance and the topic strength of the impression utterance.

Figure 4:
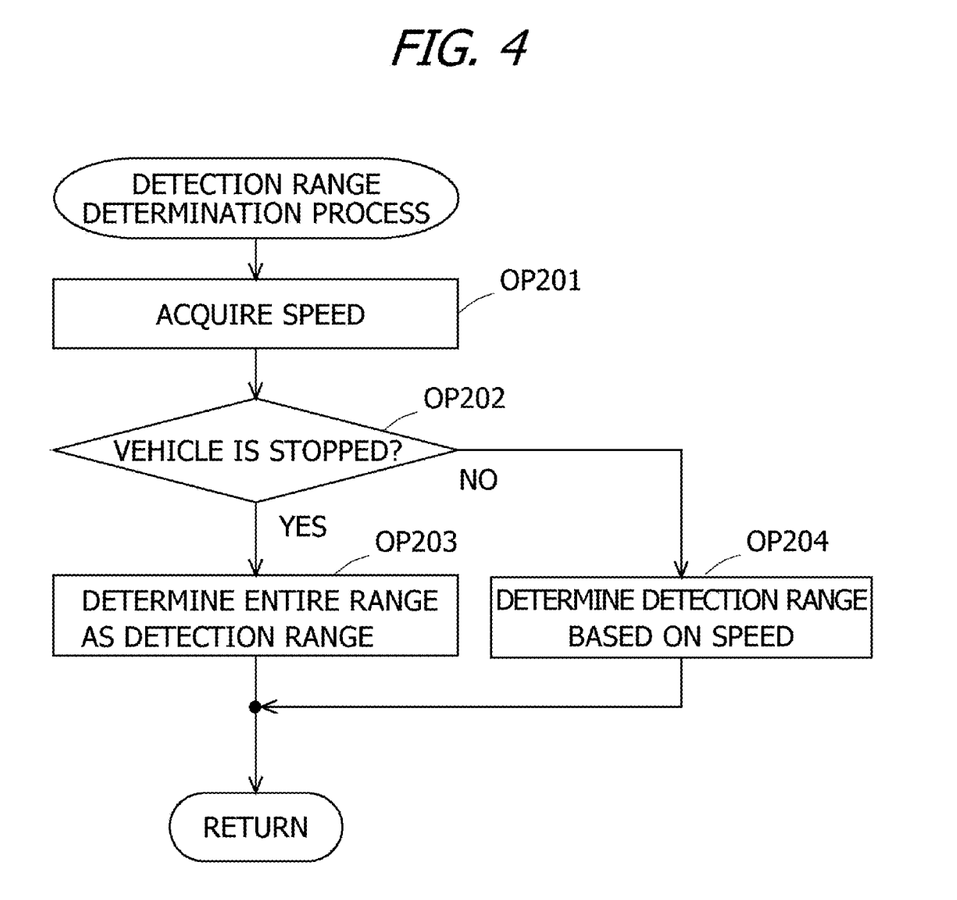
FIG. 4 is an example of a flowchart of the detection range determination process by the detection range determination unit.

FIG. 4 is an example of a flowchart of the detection range determination process by the detection range determination unit 133. The process illustrated in FIG. 4 corresponds to the process that is performed in OP105 in FIG. 3. In OP201, the detection range determination unit 133 acquires the speed of the vehicle 2 from the information about the travel state of the vehicle 2. In OP202, the detection range determination unit 133 determines whether vehicle 2 is stopped or not, based on the speed of the vehicle 2. In the case where the vehicle 2 is stopped (OP202: YES), the process proceeds to OP203. In OP203, the detection range determination unit 133 determines the entire range of the captured image to be the detection range. Then, the process illustrated in FIG. 4 is ended, and the process proceeds to OP106 in FIG. 3.

In the case where the vehicle 2 is not stopped (OP202: NO), the process proceeds to OP204. In OP204, the detection range determination unit 133 determines the detection range of the captured image based on the speed of the vehicle 2. For example, in the case where the speed of the vehicle 2 is equal to or greater than a threshold 1 and smaller than a threshold 2, the detection range determination unit 133 sets the detection range to the initial value described above. For example, in the case where the speed of the vehicle 2 is smaller than the threshold 1, the detection range determination unit 133 sets the detection range to a range that is wider than the initial value described above. For example, in the case where the speed of the vehicle 2 is equal to or greater than the threshold 2, the detection range determination unit 133 sets the detection range to a range that is narrower than the initial value described above. Then, the process illustrated in FIG. 4 is ended, and the process proceeds to OP106 in FIG. 3.

Operations and Effects of First Embodiment

Figure 5:
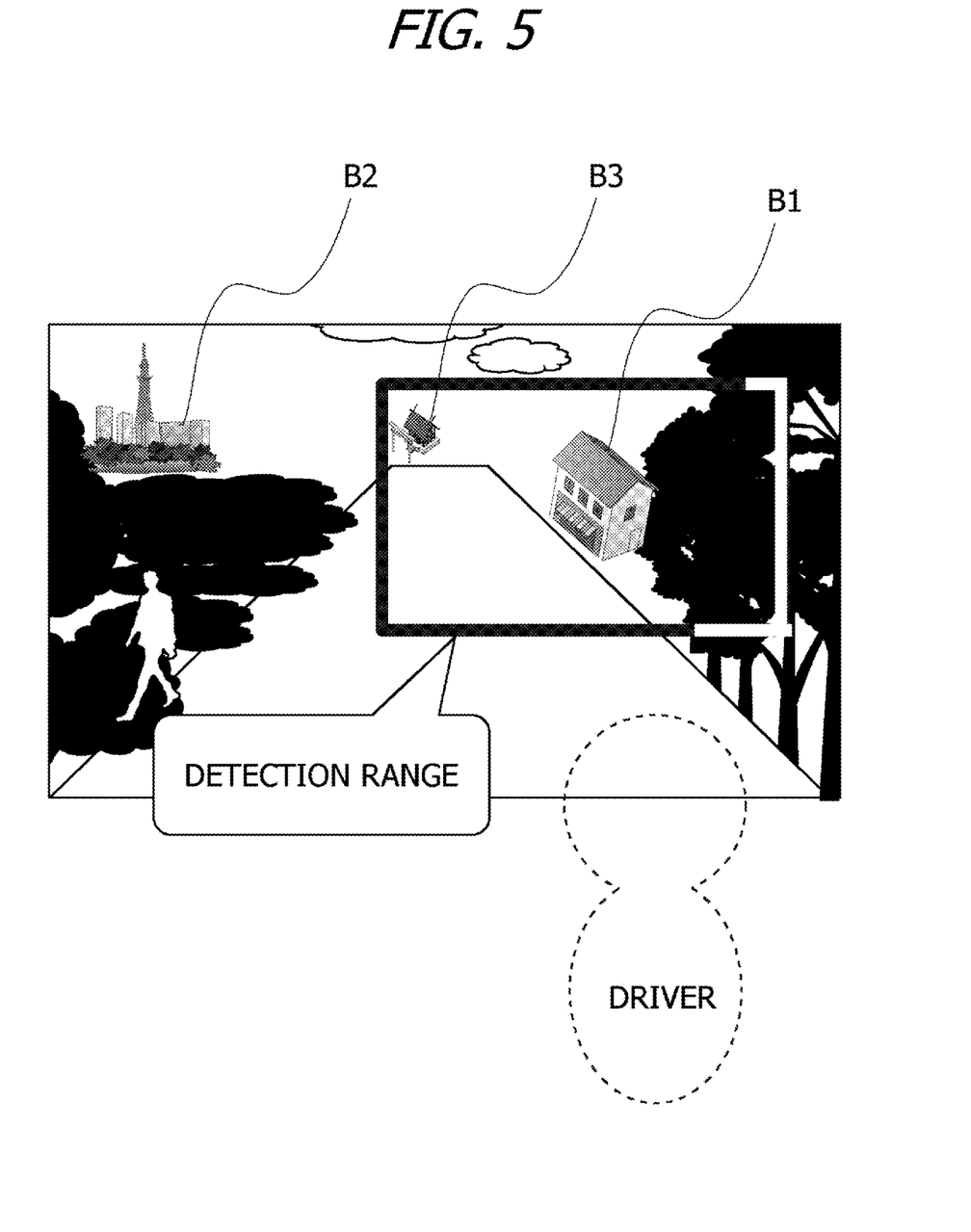
FIG. 5 is a diagram illustrating an example of the detection range in the captured image from the camera.

FIG. 5 is a diagram illustrating an example of the detection range in the captured image from the camera 202. The server 1 determines the detection range in the captured image from the camera 202 in the manner illustrated in FIG. 5. In Japan, left-hand traffic is adopted, and the driver's seat is usually on the right side in the traveling direction. Accordingly, the detection range is set to the right in the captured image with the line of sight of the driver at the center.

In the example illustrated in FIG. 5, a building B1 included in the detection range is detected, and an impression utterance that takes the building B1 as the topic is generated. The building B1 can be easily found by the onboard person. Accordingly, even in a case where the onboard person is the driver and manned driving is being performed, for example, looking for the building B1 does not obstruct driving.

In contrast, a building B2 is present outside the detection range. Accordingly, in the first embodiment, an impression utterance that takes the building B2 as the topic is not generated. Furthermore, a building B3 is included in the detection range, but has a size that is smaller than a predetermined value. Accordingly, in the first embodiment, an impression utterance that takes the building B3 as the topic is not generated. Even if an utterance that takes the building B2 or the building B3 as the topic is presented, the onboard person is highly likely not able to find the building B2 or the building B3 or recognize the external appearance of the building B2 or the building B3. In this manner, in the first embodiment, an utterance that takes, as the topic, an object that is not easily found by the onboard person is not generated, and thus, a smooth conversation can be provided to the onboard person. Furthermore, in the first embodiment, in the case where the onboard person is the driver and manned driving is being adopted, driving of the vehicle 2 by the onboard person is prevented from being obstructed by the conversation with the conversational system 100. This is because an utterance that takes, as the topic, an object that is not easily found is not generated. Accordingly, even when an utterance is provided by the conversational system 100 while the onboard person is driving the vehicle 2, safety of traveling of the vehicle 2 is secured.

Other Embodiments

The embodiments described above are examples, and the present disclosure may be changed and carried out as appropriate without departing from the gist of the present disclosure.

Functional components same as those of the server 1 may be mounted in the vehicle 2 to allow the vehicle 2 to perform the processes of the server 1 according to the first embodiment. That is, the vehicle 2 may perform utterance generation.

For example, the detection range in the captured image from the camera 202 may be moved following the line of sight of the onboard person. For example, the vehicle 2 may include a camera for detecting the line of sight of the onboard person in the vehicle, and may transmit a captured image from the camera to the server 1. The captured image from the camera for detecting the line of sight of the onboard person will be referred to as a line-of-sight detection image. The server 1 detects, from the line-of-sight detection image, a position of the line of sight of the onboard person in the capturing range. For example, the server 1 may hold history information about the position of the line of sight of the onboard person. In the case of setting the detection range, the server 1 may identify a position where the line of sight of the onboard person is focused on within a predetermined period of time such as immediately preceding five minutes, and may use the identified position as a center of the detection range, for example. Additionally, identification of the position of the line of sight of the onboard person may be performed by the vehicle 2. The vehicle 2 may transmit a result of identification of the position of the line of sight of the onboard person to the server 1.

Furthermore, in the first embodiment, in the case where the vehicle 2 is in the autonomous driving mode, the server 1 detects an object by taking the entire range of the captured image from the camera 202 as the detection range, and generates an impression utterance that takes the detected object as the topic. In the case where the vehicle 2 is in the autonomous driving mode, the server 1 may further perform a process of the target selection unit 135 for further extracting an object, the size of which takes a predetermined value or more, from among at least one object detected from the captured image from the camera 202.

The processes and means described in the present disclosure may be freely combined to the extent that no technical conflict exists.

A process which is described to be performed by one device may be performed among a plurality of devices. Processes described to be performed by different devices may be performed by one device. Each function to be implemented by a hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An information processing apparatus, comprising a processor configured to:
    select one or more first objects detected from a predetermined range in a captured image from an on-board camera that takes an outward direction from a moving object as a capturing range, the predetermined range being based on a field of view of an onboard person in the moving object, and
    generate utterance content that takes the selected one or more first objects as a topic, the utterance content being to be uttered to the onboard person, wherein
    the processor is further configured to set the predetermined range based on at least one of a traveling speed of the moving object, whether traveling is performed by autonomous driving of the moving object or not, and a position where a line of sight of the onboard person is focused on.

2. The information processing apparatus according to claim 1, wherein the processor is further configured to select, as the one or more first objects, an object, a size of which in the captured image takes a predetermined value or more, among at least one object included in the predetermined range in the captured image.

3. The information processing apparatus according to claim 1, wherein the processor is further configured to stop generation of the utterance content in a case where a travel state of the moving object satisfies a predetermined condition indicating a state where a load on the onboard person is high.

4. A method, comprising causing a computer to:
    select one or more first objects detected from a predetermined range in a captured image from an on-board camera that takes an outward direction from a moving object as a capturing range, the predetermined range being based on a field of view of an onboard person in the moving object, and
    generate utterance content that takes the selected one or more first objects as a topic, the utterance content being to be uttered to the onboard person, wherein
    the method further comprises causing the computer to set the predetermined range based on at least one of a traveling speed of the moving object, whether traveling is performed by autonomous driving of the moving object or not, and a position where a line of sight of the onboard person is focused on.

5. The information processing apparatus according to claim 1, wherein the processor is provided in a server configured to communicate with the moving object.

6. The information processing apparatus according to claim 1, wherein the processor is mounted on the moving object.

7. The information processing apparatus according to claim 1, wherein the processor is configured to set the predetermined range in a case where the travelling is performed by manned driving of the moving object and the onboard person is a driver of the moving object.

8. The information processing apparatus according to claim 1, wherein the processor is further configured to:
    acquire spot information in relation to the selected one or more objects;

input the spot information to a machine learning model to generate at least one impression utterance;

estimate a strength of the at least one generated impression utterance; and output the estimated strength and the at least one generated impression utterance.

9. The information processing apparatus according to claim 1, wherein the processor is further configured to narrow the predetermined range, in response to an increase in the traveling speed of the moving object.

10. The information processing apparatus according to claim 1, wherein the processor is further configured to not set the predetermined range in a case where the traveling is performed by the autonomous driving of the moving object.

11. The information processing apparatus according to claim 1, wherein the processor is configured to set the predetermined range by taking, as a center, a position where the line of sight of the onboard person is focused on.

* * * * *